United States Patent [19]

Kino et al.

[11] Patent Number: 5,781,339
[45] Date of Patent: Jul. 14, 1998

[54] OPTICAL DEVICE FOR DEFLECTING LIGHT

[75] Inventors: Yoshiki Kino, Tokyo; Shoichi Shimura, Yokohama; Takashi Kai, Hadano; Naoki Kobayashi, Tokyo, all of Japan

[73] Assignee: Canon Kabushiki Kaisha, Tokyo, Japan

[21] Appl. No.: 542,785

[22] Filed: Oct. 13, 1995

Related U.S. Application Data

[63] Continuation of Ser. No. 94,315, Jul. 21, 1993, abandoned.

[30] Foreign Application Priority Data

Jul. 24, 1992 [JP] Japan ................... 4-198659

[51] Int. Cl.$^6$ .................. G02B 27/64; G02B 5/06
[52] U.S. Cl. .................. 359/557; 359/554; 359/831; 359/832
[58] Field of Search .................. 359/832, 557, 359/554, 209–211, 831–837, 819, 827

[56] References Cited

U.S. PATENT DOCUMENTS

| | | | |
|---|---|---|---|
| 3,337,287 | 8/1967 | Lessman | 359/832 |
| 3,514,192 | 5/1970 | Cierva | 359/832 |
| 5,168,385 | 12/1992 | Kobayashi et al. | 359/209 |
| 5,311,367 | 5/1994 | Ohki et al. | 359/832 |

FOREIGN PATENT DOCUMENTS

| | | | |
|---|---|---|---|
| 41-11906 | 6/1966 | Japan . | |
| 124519 | 5/1990 | Japan | 359/554 |
| 2-124518 | 5/1990 | Japan . | |
| 2124520 | 5/1990 | Japan | 359/354 |
| 5217810 | 9/1991 | Japan | 359/554 |

OTHER PUBLICATIONS

"Canon's Variangle Prism Optically Corrects Image Blur", JEE Journal of Electronic Engineering, pp. 84–85, No. 306, Jun. 1, 1992, Tokyo, Japan.

"Liquid Accordion Beam Steering Device for Excimer Laser", IBM Technical Disclosure Bulletin, p. 399, vol. 34, No. 10B, Mar. 1, 1992, U.S.

English Abstract of Japanese Reference No. JP3293601, vol. 16, No. 131.

English Abstract of Japanese Reference No. JP2124520, vol. 14, No. 349.

Primary Examiner—Thong Nguyen
Attorney, Agent, or Firm—Fitzpatrick, Cella, Harper & Scinto

[57] ABSTRACT

The prevent invention relates to an optical device capable of varying the angle formed by a pair of optical elements. The optical device comprises a pair of support members having portions for preventing the optical elements from slipping outwardly, and for supporting the optical elements, a connection member for forming a watertight space, the connection member being adhesively secured to the support members and being deformable, and a transparent substance filling the watertight space.

23 Claims, 3 Drawing Sheets

OPTICAL DEVICE FOR DEFLECTING LIGHT

This application is a continuation of application Ser. No. 08/094,315 filed Jul. 21, 1993, now abandoned.

BACKGROUND OF THE INVENTION

1. Field of the Invention

This invention relates to an optical device designed such that the relative angle of two plates comprising transparent optical elements having an optically transparent substance enclosed therein is varied to thereby arbitrarily vary the optical performance of a light beam passed therethrough, and this optical device is suitable for an image stabilizing optical system disposed, for example, in a portion of the photo-taking system of a photographic camera, a video camera or the like and designed to correct the vibration of an image caused by the vibration of the photo-taking system.

2. Related Background Art

There have heretofore been proposed various optical devices in which an optically transparent substance such as liquid or silicone rubber is enclosed between two transparent plane parallel plates to thereby form a variable angle prism and the angle (the degree of parallelism) of the two plane parallel plates is varied by an extraneous biasing force to thereby arbitrarily vary the optical performance of a light beam passed therethrough.

For example, an optical device proposed in Japanese Patent Publication No. 41-11906 is comprised of two transparent plane parallel plates disposed in opposed relationship with each other, a connection member in the form of flexible bellows surrounding the plane parallel plates, and transparent liquid enclosed therein.

FIG. 6 of the accompanying drawings is a schematic view of an optical device proposed in Japanese Laid-Open Patent Application No. 2-124518. In FIG. 6, optically transparent plane parallel plates 1 and 1' formed of glass or a plastic material or the like have their circumferences held by annular support members 4 and 4' comprising plastic molded articles or the like of high hardness. Also, a cylindrical connection member 2 formed of laminated high molecular film, aluminum foil or the like and formed into a Y-shaped cross-section is made by the tip end portions of two deformable members being thermally secured to each other and has its other ends thermally secured to the support members 4 and 4'. An optically transparent substance 3 comprising water, alcohol, glycol, silicone oil, silicone gel, silicone rubber, organic oil or the like is enclosed in a space defined by the support members 4, 4', the plane parallel plates 1, 1' and the connection member 2.

In any of the optical devices proposed in the aforementioned Japanese Patent Publication No. 41-11906 and Japanese Laid-Open Patent Application No. 2-124518, the angle of the two plane parallel plates is varied to thereby form a variable angle prism whose vertical angle is arbitrarily controllable, and an incident light beam is deflected by a predetermined angle and caused to emerge.

However, the optical device of the above-mentioned Japanese Laid-Open Patent Application No. 2-124518, as shown in FIG. 6, comprises the arrangement of the connection member 2, the support members 4, 4', the plane parallel plates 1, 1' and the transparent substance 3 and therefore, it has suffered from the undesirable possibility that when it is brought into special environment and the internal pressure of the optical device rises, the volume of the transparent substance 3 within the optical device expands and thus, the plane parallel plates 1, 1' are forced out by the internal pressure and slip off.

SUMMARY OF THE INVENTION

It is an object of the present invention to prevent the damage as noted above which is caused to an optical device by environmental factors.

It is a second object of the present invention to provide an optical device in which two transparent planar optical elements are disposed in opposed relationship with each other and when they are connected together by a connection member so as to define a space therebetween and a transparent substance enclosed in the space is sandwiched to form a variable angle prism, the air-contacting surfaces of the optical elements are held by support members, whereby the optical elements can be prevented from slipping off the support members.

It is another object of the present invention to provide an optical device in which planar optical elements are held by support members in a manner similar to the aforedescribed manner and further, a connection member is adhesively secured to the planar optical elements, whereby there is obtained the effect of enhancing internal airtightness.

It is still another object of the present invention to provide an optical device in which planar optical elements are held by support members in a manner similar to the aforedescribed manner and a connection member is adhesively secured to the planar optical elements and further, the connection member is thermally secured to the support members, whereby there is obtained the effect of enhancing internal airtightness as well as enhancing the adhesive securement strength of each portion.

DESCRIPTION OF THE PREFERRED EMBODIMENTS

Figure 1A:
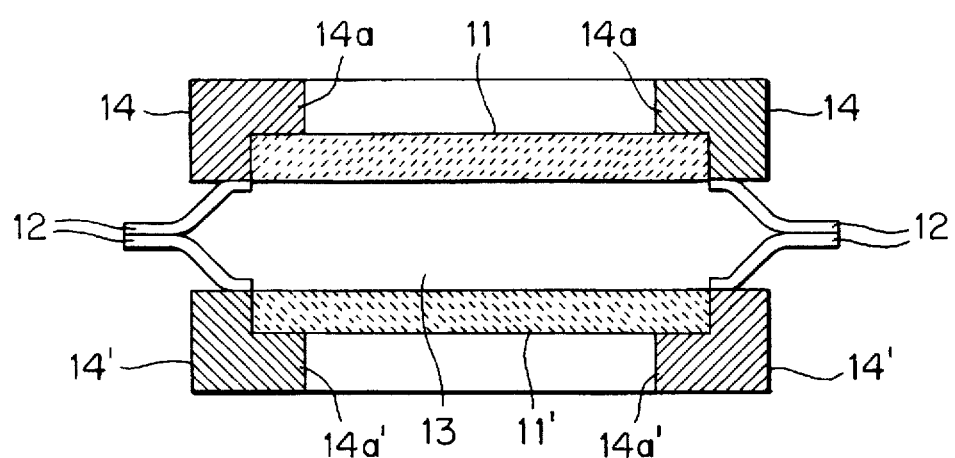
FIG. 1(a) is a cross-sectional view of a first embodiment of the present invention.
Figure 1B:
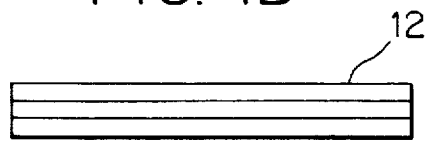
FIG. 1(b) is a cross-section of the connection members illustrated in FIG. 1(a)
Figure 2:
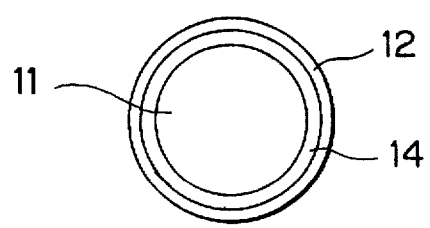
FIG. 2 is a plan view of the first embodiment of the present invention.

FIG. 1(a) and 1(b) are cross-sectional views and FIG. 2 is a plan view, respectively, of the essential portions of a first embodiment of the present invention. In FIGS. 1(a), 1(b) and 2, the reference numerals 11 and 11' designate optically transparent plane parallel plates formed of glass or a plastic material, the reference numeral 12 denotes cylindrical connection members formed of laminated deformable high molecular film or aluminum foil, the reference numeral 13 designates an optically transparent substance such as water, alcohol, silicone oil, deformed silicone oil, silicone gel, silicone rubber or organic oil, and the reference numerals 14 and 14' denote annular support members comprising, for example, plastic molded articles of high hardness.

The construction of the present embodiment will now be described. The connection member 12 are thermally secured to each other and have their end portions enveloped so as to form a Y-shaped cross-section. The other ends of the connection members 12 are likewise thermally secured to the support members 14 and 14'. In this case, the material of the adhesively secured portions of the connection members 12 may preferably be one which readily permits the connection members 12 to be thermally secured to each other and which will not dissolve into the transparent substance 13 or will not expand, and as such material, mention may be made, for example, of low-density polyethylene or high-density polyethylene. The support members 14, 14' and the connection members 12 are likewise thermally secured together and therefore, the support members 14, 14', like the connection members 12, may preferably be formed of low-density polyethylene or high-density polyethylene. The connection members 12 may be made into three-layer structure having a material such as aluminum foil sandwiched therein in order to prevent humidity absorption. Also, the support members 14 and 14' each may have a material harder than polyethylene, for example, a metal such as aluminum or a plastic such as polycarbonate inserted therein.

Figure 3:
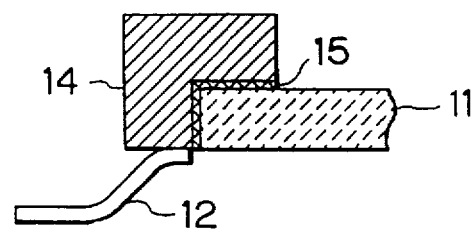
FIG. 3 is a fragmentary cross-sectional view showing a method of holding plane parallel plates by support members.

FIG. 3 shows the details of a method of holding the plane parallel plates 11 and 11' by the support members 14 and 14'. In FIG. 3, the reference numeral 15 designates an adhesive layer for fixing the support member 14 and the plane parallel plate 11 to each other. In that case, the support member 14 has a portion 14a protruding from an end of the plane parallel plate 11 and thus, supports the plane parallel plate 11 from the outer side (the side which is in contact with air). This also holds true of the support member 14', the plane parallel plate 11' and the adhesive layer 15'. To adhesively secure the support member 14 and the corresponding plane parallel plate 11 to each other, use is made of an adhesive like thermoplastic resin or thermosetting resin such as epoxy, polyamide, polyimide, cyanoacrylate, olefin phenol, urethane, silicone resin or halogen-containing resin which is not swollen or eluded by the interval liquid 13 and is excellent in adhesive strength.

Further, a rubber adhesive such as NBR (synthetic rubber of a copolymer of butadiene and acrylonitrile), SBR (synthetic rubber provided by the copolymerization of butadiene and styrene), silicone rubber or halogen-containing rubber such as fluorine resin, which can absorb distortion caused by the curing, contraction or the like after adhesion or distortion caused by the physical property differences between the support member 14 and the plane parallel plate 11 such as the difference in coefficient of expansion and the difference in hardness, is preferable as an adhesive. Further, silicone adhesives or modifications thereof, or fluorine adhesives, which are excellent in solvent resistance and weather resistance, are particularly preferable as an adhesive.

That is, in FIG. 3, the plane parallel plate 11 is characterized in that the surface thereof which is in contact with air is held. By this holding method, the outward falling of the plane parallel plate 11 which has heretofore been feared can be prevented. Also, when this holding method is employed, there is the risk of the plane parallel plate 11 falling inwardly, but since the above-described optical device has the transparent substance 13 enclosed therein, the inward falling of the plane parallel plate 11 is not thinkable unless any extraneous force is applied to the plane parallel plate 11.

Figure 4:
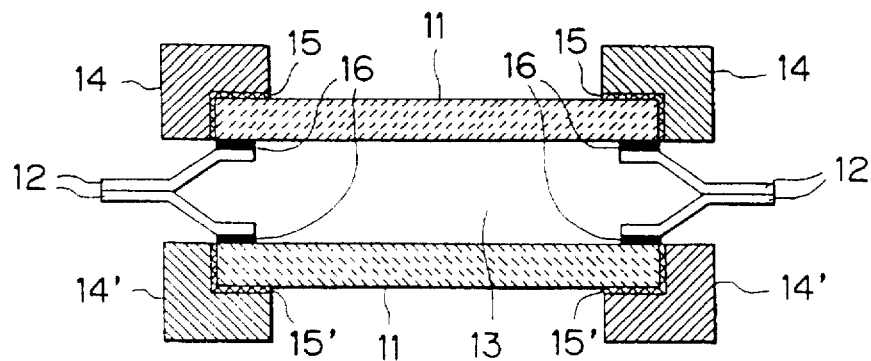
FIG. 4 is a cross-sectional view of a second embodiment of the present invention.

FIG. 4 is a cross-sectional view of the essential portions of a second embodiment of the present invention. In this embodiment, reference numerals similar to those in the first embodiment designate members similar to those in the first embodiment and therefore, these members need not be described. In FIG. 4, the reference numeral 16 denotes an adhesive for securing the connection members 12 and plane parallel plates 11 to each other. This adhesive 16, like the adhesive 15, is in contact with the transparent substance 13 and therefore, must preferably not be one which will cause the transparent substrate 13 to degenerate or swell. Also, the adhesive 16 may preferably be an adhesive which will secure the plane parallel plates 11, 11' and connection members 12 to each other with good strength, and may suitably be an adhesive like thermoplastic resin or thermosetting resin such as epoxy, polyamide, polyimide, cyanoacrylate, olefin phenol, urethane, silicone resin or halogen-containing resin, or a rubber adhesive like halogen-containing rubber such as NBR (synthetic rubber of a copolymer of butadiene and acrylonitrile), SBR synthetic rubber provided by the copolymerization of butadiene and styrene), silicone rubber or fluorine rubber.

In the optical device of the present invention, by effecting adhesive securement as shown in FIG. 4, the plane parallel plates 11 and 11' are held from the surfaces thereof which are in contact with air, by the support members 14, and therefore, not only the outward falling of the plane parallel plates 11 and 11' can be prevented, but also the plane parallel plates 11 and 11' and the connection members 12 are adhesively secured together by the adhesive 16, whereby the adhesive 15 and transparent substance 13 do not contact with each other and thus, the transmission of air can be reduced. That is, there is obtained the effect of enhancing the airtightness of the optical device.

Figure 5:
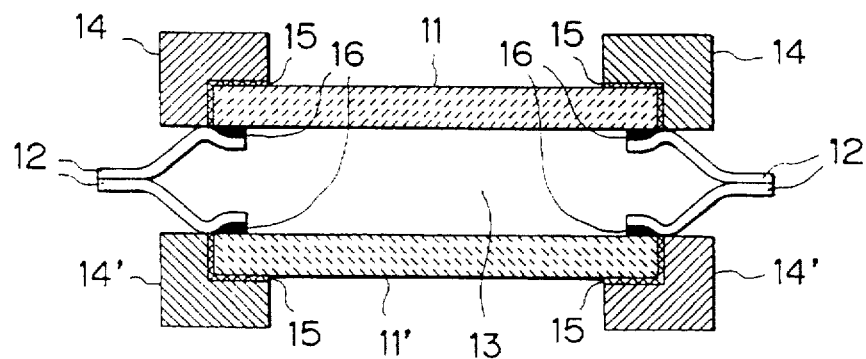
FIG. 5 is a cross-sectional view of a third embodiment of the pre sent invention.
Figure 6:
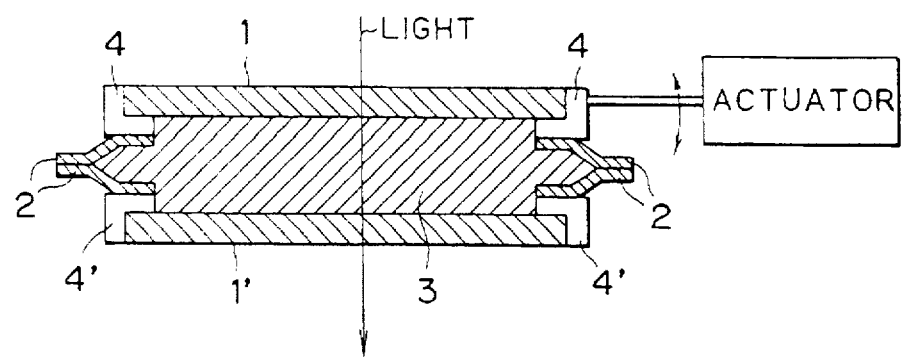
FIG. 6 is a cross-sectional view illustrating an optical device according to the prior art.

FIG. 5 is a cross-sectional view of the essential portions of a third embodiment of the present invention. In this embodiment, reference numerals similar to those in the first and second embodiments designate members similar to those in the first and second embodiments and therefore, these members need not be described. In FIG. 5, the connection members 12 are adhesively secured to the plane parallel plates 11 and 11' by the use of an adhesive 16, and the connection member 12 are thermally secured to the support members 14 and 14'. Thereby, the plane parallel plates 11, 11' are held from the surfaces thereof which are in contact with air, as in the first embodiment, and therefore, not only the possibility of the plane parallel plates 11, 11' falling outwardly can be prevented, but also the adhesive securement and thermal securement can suppress the transmission of air into the interior of the optical device, and by such structure, the peeling of the connection members 12 can be prevented.

As described above, according to the present invention, when two transparent plates are disposed in opposed relationship with each other and the transparent plates are supported by the support members and the support members and securing members are connected together by the connection members and a transparent substance is enclosed therein to form an optical element such as a variable angle prism, the transparent plates are held from the surfaces thereof which are in contact with air, by the support members, as previously described, whereby there can be achieved an optical device in which the transparent plates can be prevented from coming off the support members.

Also, by the connection members being adhesively secured to the transparent plates, the transmission of air from the surfaces on which the transparent plates and the support members are adhesively secured together becomes unthinkable, and there can be achieved an optical device the airtightness of which can be enhanced.

Further, by the connection members being adhesively secured to the transparent plates and being thermally secured to the support members, there can be achieved an optical device the airtightness of which is more enhanced and in which the peeling of the connection members can be prevented by the dual structure of adhesive securement and thermal securement.

What is claimed is:

1. An optical device capable of varying an angle formed by a pair of optical elements comprising:

a pair of support members having portions for preventing the optical elements from slipping outwardly, and for supporting the optical elements, each of the pair of optical elements and each of said pair of support members having a surface facing another of the pair of optical elements and another of said pair of support members, wherein the facing surfaces formed by the optical elements and said support members are substantially flat surfaces;

a connection member for forming a watertight space, each end portion of said connection member being adhesively secured to each of said facing surfaces of said pair of optical elements through an adhesive layer and being deformable, and each end portion of said connection member being thermally secured to each of said facing surfaces of said pair of support members; and a transparent substance filling said watertight space.

2. An optical device according to claim 1, wherein each of said optical elements has an end portion and edge portions, and wherein said portions for preventing the optical elements from slipping outwardly protrude from the end portions of said optical elements and cover the edges of said optical elements.

3. An optical device according to claim 1, wherein said adhesive layer is a layer comprising a rubber type adhesive agent.

4. An optical device capable of varying an angle formed by a pair of optical elements, comprising:

a pair of support members having portions for preventing the optical elements from slipping outwardly, and for supporting the optical elements, each of the pair of optical elements and each of said pair of support members having a surface facing another of said pair of optical elements and another of said pair of support members, wherein the facing surfaces formed by said optical elements and said support members are substantially flat surfaces;

a connection member for forming a watertight space, each end portion of said connection member being adhesively secured to each of said facing surfaces of said pair of optical elements through an adhesive layer and being deformable, said connection member comprising a plurality of layers, wherein a material of a surface layer of said plurality of layers is the same as a material of said pair of support members, and each end portion of said connection member being thermally secured to each of said facing surfaces of said pair of support members; and a transparent substance filling said watertight space.

5. An optical apparatus, comprising:

a transparent member;

a pair of optical members, each of said pair of optical members having a surface facing another of said pair of optical members;

a pair of supporting members for supporting each of said pair of optical members, each of said pair of supporting members having a surface for supporting a surface of a corresponding one of said pair of optical members at a side opposite to a side of said transparent member, each of said pair of supporting members being constructed of a single member, and each of said pair of supporting members having a surface facing another of said pair of optical members wherein the facing surfaces formed by said optical members and said supporting members are substantially flat surfaces; and a connecting member, each end portion of said connecting member being respectively secured to the facing surfaces of said pair of supporting members and to the facing surfaces of said pair of optical members, each end portion of said connecting member being respectively connected to one of said pair of supporting members by thermal adhesion, and each end portion of said connecting member being respectively connected to one of said pair of optical members with an adhesive agent, wherein a sealed space defined by said pair of optical members and said connecting member is filled with said transparent member.

6. An apparatus according to claim 5, wherein said pair of optical members are respectively made of a transparent and parallel flat plate.

7. An apparatus according to claim 5, wherein each of said supporting members has a surface for supporting an end surface of one of said optical members.

8. An apparatus according to claim 5, wherein a surface of said each end portion of said connecting member is adhered to a surface of one of said supporting members.

9. An apparatus according to claim 8, wherein said connecting member is made by a plurality of laminated layers and a surface layer of said connecting member is adhered to a surface of said one of said supporting members.

10. An apparatus according to claim 8, wherein an adhering portion between said connecting member and said one of said supporting members is mutually made of the same material.

11. An apparatus according to claim 10, wherein said connecting member is made by a plurality of laminated layers and a layer of said connecting member is adhered to a surface of said one of said supporting members.

12. An apparatus according to claim 5, wherein each of said pair of supporting members is connected to a corresponding one of said pair of optical members with an adhesive agent.

13. An apparatus according to claim 12, wherein said adhesive agent is a rubber type adhesive agent.

14. An apparatus according to claim 5, wherein said transparent member and said connecting member are each respectively made of one of a plurality of deformable materials.

15. An apparatus according to claim 14, wherein said pair of optical members are respectively made of a transparent and parallel flat plate.

16. An apparatus according to claim 15, wherein said apparatus is capable of varying an angle made by said pair of transparent and parallel flat plates.

17. An apparatus according to claim 15, wherein each of said supporting members has a surface for supporting an end surface of one of said optical members.

18. An apparatus according to claim 15, wherein a surface of said each end portion of said connecting member is adhered to a surface of each of said supporting members.

19. An apparatus according to claim 18, wherein said connecting member is made by a plurality of laminated layers and a layer of said connecting member is adhered to a surface of each of said supporting members.

20. An apparatus according to claim 18, wherein an adhering portion between said connecting member and each of said supporting members is mutually made of the same material.

21. An apparatus according to claim 20, wherein said connecting member is made by a plurality of laminated layers and a layer of said connecting member is adhered to a surface of each of said supporting members.

22. An apparatus according to claim 15, wherein each of said pair of supporting members is connected to a corresponding one of said pair of optical members with an adhesive agent.

23. An apparatus according to claim 22, wherein said adhesive agent is a rubber-type adhesive agent.

* * * * *

UNITED STATES PATENT AND TRADEMARK OFFICE
CERTIFICATE OF CORRECTION

PATENT NO. : 5,781,339
DATED : July 14, 1998
INVENTOR(S) : Kino et al.

It is certified that error appears in the above-identified patent and that said Letters Patent is hereby corrected as shown below: On the title page,

[56] References Cited:

FOREIGN PATENT DOCUMENTS

"2124520  5/1990  Japan
 5217810  9/1991  Japan" should read
--2-124520  5/1990 Japan
  3-217810  9/1991 Japan--.

[57] ABSTRACT:

Line 2, "prevent" should read --present--.

COLUMN 2:

Line 49, "pre sent" should read --present--; and
Line 55, "FIG. 1(a)" should read --FIGS. 1(a)--.

COLUMN 3:

Line 2, "member" should read --members--.

Signed and Sealed this

Eleventh Day of May, 1999

Attest:

Q. TODD DICKINSON

*Attesting Officer*     *Acting Commissioner of Patents and Trademarks*